United States Patent
Gross

(10) Patent No.: US 10,710,727 B2
(45) Date of Patent: Jul. 14, 2020

(54) SEAT SYSTEM FOR A CABIN OF A TRANSPORTATION MEANS WITH A COMPACTABLE SEAT ROW

(71) Applicant: Airbus Operations GmbH, Hamburg (DE)

(72) Inventor: Claus-Peter Gross, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 418 days.

(21) Appl. No.: 15/604,321

(22) Filed: May 24, 2017

(65) Prior Publication Data

US 2017/0341754 A1    Nov. 30, 2017

(51) Int. Cl.
*B62D 11/06* (2006.01)
*B64D 11/06* (2006.01)

(52) U.S. Cl.
CPC ...... *B64D 11/0696* (2013.01); *B64D 11/0639* (2014.12); *B64D 11/0648* (2014.12)

(58) Field of Classification Search
CPC ............. B64C 11/0696; B64C 11/0639; B64C 11/0648; B64C 1/20; B64D 11/0696; B64D 11/0639; B64D 11/0648; B60N 2/07
USPC ..... 296/65.13, 64.14, 65.15; 297/239, 344.1, 297/344.11
See application file for complete search history.

(56) References Cited

U.S. PATENT DOCUMENTS

| | | | | |
|---|---|---|---|---|
| 5,364,152 A | * | 11/1994 | Mastrangelo | ........ B60N 2/3011 296/65.03 |
| 5,529,378 A | * | 6/1996 | Chaban | .............. B60N 2/01508 297/331 |
| 8,556,348 B2 | * | 10/2013 | Glaser | .................... B60N 2/688 296/65.09 |
| 9,656,753 B2 | | 5/2017 | Schomacker et al. | |
| 2009/0021040 A1 | * | 1/2009 | Yamasaki | .............. B60N 2/062 296/65.13 |
| 2012/0175930 A1 | | 7/2012 | Jovicevic | |

FOREIGN PATENT DOCUMENTS

| | | |
|---|---|---|
| DE | 102009004987 A1 | 7/2010 |
| EP | 2679498 A2 | 1/2014 |
| FR | 2572340 A1 | 5/1986 |
| FR | 2878792 A1 | 6/2006 |

OTHER PUBLICATIONS

The German Patent and Trade Mark Office, Search Report for German Patent Application No. 10 2016 109 789.6 dated Dec. 9, 2016.

* cited by examiner

*Primary Examiner* — Joseph D. Pape
(74) *Attorney, Agent, or Firm* — Lorenz & Kopf LLP

(57) ABSTRACT

A seat system for a cabin of a transportation system includes a first seat unit, a second seat unit, and a rail system attachable to a floor of the cabin, having two rails that run parallel to each other, for receiving the seat units on selective positions. A line-up of a plurality of first seat units and at least one second seat unit on the rail system constitutes a seat arrangement. The first seat unit includes a seat frame having a seat cushion and a back cushion. The second seat unit includes a seat frame having a foldable seat cushion and a back cushion. The second seat frame includes two forward seat legs supported on two auxiliary rail segments that are arranged between the rails in a region. The forward seat legs are guidable underneath the seat cushion of a first seat unit arranged in front of it.

15 Claims, 5 Drawing Sheets

SEAT SYSTEM FOR A CABIN OF A TRANSPORTATION MEANS WITH A COMPACTABLE SEAT ROW

CROSS-REFERENCE TO RELATED APPLICATION

This application claims the benefit of, and priority to, German patent application number DE 102016109789.6, filed May 27, 2016.

TECHNICAL FIELD

Embodiments of the invention relate to a seat system for a cabin of a transportation system, a cabin having such a seat system as well as an aircraft having such a cabin.

BACKGROUND

Usually, in vehicles, which serve the transport of passengers, passenger seats and other installations are fastened on floor rails, which have fastening means arranged in a certain raster. Different fastening positions on the floor rails may be realized through the raster. A fastening of the respective object at a desired position is usually conducted through an arresting device, which conducts a form and/or force-fitting arresting with fastening means of the floor rail.

In particular in aircraft it is also known to set a distance between seats that follow on each other in a longitudinal direction depending on a desire or a temporary request and to change it occasionally or frequently. For this, the arresting devices of the respective seats are released, afterwards the seats are moved along the floor rail and the arresting devices are arrested again. Changing the distance particularly between two passenger seats arranged behind each other, the seating class of the respective section in the passenger cabin may be changed.

German patent document DE 10 2009 004 987 B4 shows a movable seat for a transportation system, having a seat frame for displaceably mounting on a support structure of the transportation system, wherein the seat is designed in such a manner that two seats arranged behind each other in the transportation system in a storage state, in which the seats are pushed together and at least partially into each other, comprise a smaller common based surface than in a pushed apart use state.

German patent document DE 10 2013 103 662 A1 shows a holding device for passenger seats in a transportation system, which device comprises a seat leg fixation element, a gliding element and a rail element.

BRIEF SUMMARY

It is an object of the disclosure to propose a seat system or a seat arrangement, respectively, with which compactable seats or seat rows, respectively, are particularly easily and comfortably compactable, are usable in a normal operating state as usual and have a firm stand in a compacted state.

The object is met by a seat system having the features of independent claim 1. Advantageous embodiments and further improvements can be gathered from the sub-claims and the following description.

A seat system for a cabin of a transportation system is proposed, the seat system comprising at least one first seat unit, at least one second seat unit and a rail system attachable to a floor of the cabin having two rails that run parallel to each other, for an arrestable receiving of the at least one first seat unit and the at least one second seat unit on selective positions. A line-up of a plurality of first seat units and at least one second seat unit on the rail system constitutes a seat arrangement in a cabin. The first seat unit comprises a first seat frame having a seat cushion as well as a back cushion. The second seat unit comprises a second seat frame having a seat cushion being foldable up as well as a back cushion. Furthermore, the second seat frame comprises two distanced forward seat legs, which are supported on two auxiliary rail segments that are arranged between the rails at least in a region, which forward seat legs are, at least in a region, guidable underneath the fixed seat cushion of a first seat unit arranged in front of it.

In this context, a seat unit is to be understood as a functional unit, on which a passenger may sit. In a transportation system and in particular an aircraft, such seat units are provided in form of passenger seats or passenger seat rows, which comprise a seat frame, on which a predetermined number of seat and back cushions are arranged. Usually, in aircraft, up to three seats adjacent to each other are realized in outer regions, while between two aisles, usually up to five seats abreast are realized. These may each be arranged on a single seat frame.

A plurality of first seat units and at least one second seat unit are strung together for creating a seat arrangement along the longitudinal direction or the extension direction of the rails, respectively. It is to be understood that also a plurality of groups of first and second seat units may create one or a plurality of seat arrangements in the cabin.

Exemplarily, a seat frame comprises two groups of each a forward seat leg, a rear seat leg and a diagonal strut extending therebetween, wherein each group of these components spans a plane that extends perpendicular to the cabin floor. Both groups are at a distance from each other and together hold a forward and a rear support tube or a single, oval support tube. The support tube(s) are at a distance from a cabin floor for receiving seat cushions and for receiving a backrest, which in particular is swivable. The seat frames are designed with such a rigidity, that by way of the seat frame the whole weight and mass forces are transferred into the rails that carry the seat frame, wherein certification relevant load factors are to be considered. Depending on a requirement and desire also differently designed seat frames are conceivable.

The seat system having two rails running parallel to each other is designed for fastening objects and particularly seat units at predetermined positions on the cabin floor. In the prior art, different kinds of rails or seat rails, respectively, are known, from which however, a type of construction known as "Douglas rail" has established particularly for aircraft cabins. This comprises a substantially belt-like base, onto which two cantilevers facing each other are arranged, which enclose a flat hollow space on the base, are distanced through a gap and are penetrated by circular openings along the gap in regular distances, which evenly extend from the gap over both cantilevers. The base may comprise a stiffening profile at a bottom side facing away from the cantilevers. Usually, such a rail is manufactured from a metallic material and is connected to the support structure of the aircraft. The mass and weight forces of all objects arranged on the rail are transferred into the structure of the aircraft through the rail.

For fastening first seat frames, holding devices may be used, which are placeable onto the top side of the rails and are arrestable or latchable, respectively, on the rail. For this, the holding devices may comprise locking elements, which have a mushroom-like shape with a shaft and a plate-like end arranged thereon, which locking elements are insertable into the hollow space of the seat rail through the openings and are movable along the shaft. The plate-like end may be clamped with a surface section of the cantilevers facing into the hollow space through exertion of a tensile force through the shaft, which surface section is arranged between the openings. A displacement of the holding devices is accomplished through releasing the respective locking elements, such that the plate-like end substantially contact-lessly remains in the hollow space of the respective rail and the locking element is movable along the gap in the rail. The shaft of the locking element is hereby adapted to the width of the gap of the rails.

However, other embodiments are known, with which holding devices are glidably supported completely. For this, the rail comprises a gliding profile, which is correspondingly shaped with a recess on the holding device. Through using one or a plurality of undercuts, a lifting-off of the holding device from the rail may reliably be prevented and a movement of the holding device is only possible along the main extension of the rail. A locking element, which is arranged on the holding device, may be limited to a movably supported pin, which may engage into raster openings, which are positioned at a top side of the rail.

The rails are couplable with the structure of the transportation system at a cabin floor of the transportation system, both directly as well as indirectly over elements therebetween. For example, it is conceivable, that a gliding rail may be arranged as a retrofit solution on a "Douglas rail".

The first seat unit comprises a seat cushion as well as a back cushion, wherein the seat cushion of the first seat frame is fixedly oriented in its use position and may not be foldable up, as an alternative it may, however, also be foldable up, without necessarily having to realize the other features of the second seat frame. The first seat unit consequently only allows to sit. A compacting of the first seat unit is thus not possible.

In turn, the second seat unit comprises a seat cushion, which is foldable up and which is exemplarily swivably supported by way of a hinge arrangement on the seat frame. A seat cushion, which is folded up, may also remain in a folded up position on the seat frame through a locking mechanism, such that during a movement of the second seat unit or during a movement of a first seat unit to a front side of the second seat unit, the seat cushion, which is folded up, does not need to be held.

A special feature of the seat system according to embodiments of the invention particularly lies in the use of two auxiliary rail segments at least in a region arranged between the rails, on which auxiliary rail segments two distanced forward seat legs are arranged. The auxiliary rail segments are positioned between the actual rails on or slightly above the cabin floor and slightly distanced from the rails, such that the distance between the auxiliary rail segments is slightly smaller than the distance between the rails themselves. Consequently, the forward seat legs stand closer together in a direction transverse to the rails in comparison to the forward seat legs or the rear seat legs of a first seat unit that are all placed on the rails. In doing so, when the seat cushion is folded up, pushing the second seat unit close to a back side of a first seat unit is allowed, as a part of the second seat frame may be moved underneath a first seat frame. Hereby, a substantial installation space may selectively be gained without conducting modifications in the cabin at all. From a certification relevant view it is to be taken care that particularly for passengers arranged directly behind a compacted second seat unit, no change in a head injuring risk occurs, since the backrest of the compacted second seat unit has the same mechanical behaviour as a common, first seat unit.

A further particular advantage lies in that the second seat unit is freely positionable in the cabin as well. All surface units ("passenger service unit, PSU"), which comprise oxygen masks, reading lights, air nozzles and the such and are associated with individual passenger seats or passenger seat rows, respectively, may remain in their predetermined positions within the cabin. The seat units may be positioned in such a manner, that the accessibility of the service units is always given.

In an advantageous embodiment, the second seat unit comprises two rear holding devices, two forward holding devices and the two auxiliary rail segments. The rear holding devices are fastenable on the rails and are each designed for supporting a rear seat leg of the second seat frame. In each case, one auxiliary rail segment is supported on a rear holding device so as to be movable parallel to the rails each and carries a forward holding device at an end opposed to the rear holding devices. The forward holding devices are each adapted for supporting a forward seat leg of the second seat frame. Consequently, the position of the forward seat legs of a second seat unit are fully determined by the position of the forward holding devices, which are mechanically coupled with the rear holding devices through the auxiliary rail segments. By fixating a rear holding device on a respective rail, the forward holding device is also fixated relative to the rail. A connection of the auxiliary rail segments with the rear holding devices has the particular advantage, that the auxiliary rail segments do not have to be fastened permanently or loosenably on a cabin floor but are completely independent therefrom. Mounting a second seat unit may consequently directly lead to realizing the particular advantages of the seat system according to embodiments of the invention.

The second seat unit may furthermore comprise two forward supporting devices, which are each connected with the rail and are each adapted for supporting an auxiliary rail segment guided parallel to the rails. Preferably, the forward support devices are always positioned between the forward holding devices and the rear holding devices, independent from the positioning of the holding devices. The exclusive support of an auxiliary rail segment at a rear holding device may, depending on the design of the holding device, lead to relatively strict stability requirements for the holding device, in order to reliably support the respective auxiliary rail segment or the forward seat leg arranged thereon, respectively. Through the utilization of a forward support device, which is positioned between a rear holding device and a forward holding device, the load introduction through the forward seat leg may be clearly improved. The forward support device may in principle be designed like a common holding device and may selectively be arrested or released on the rail with common means. For glidingly leading an auxiliary rail segment, the forward support device may comprise a respective recess.

In addition, the forward support devices may be rigidly connected through a strut that extends transverse to the rails or the auxiliary rail segments, respectively. If the second seat unit is compacted and a leading through of the auxiliary rail segments underneath a first seat frame is conducted, wherein the forward support devices and the rear holding devices approach each other, the positioning of the forward support devices relative to each other in a longitudinal direction parallel to the rail may be improved through the strut. A canting or jamming of the auxiliary rail segments or a bending away of these is thereby prevented.

In a preferred embodiment, the forward support devices are adapted for supporting the auxiliary rail segments to be displaceable in a permanently unblocked manner. The main load along the rails, which is introduced into the structure of the transportation system through the second seat unit, consequently reaches the structure through the rear holding devices. Through such a construction, exclusively the rear holding devices may be of relevance for use and certification of the second seat unit in a transportation system and in particular in a commercial aircraft, which rear holding devices absorb the loads in the longitudinal direction of the cabin.

The second seat unit may furthermore be designed for holding a support strut between a rear seat leg and a forward support device of the same side, when the forward support devices are shifted to the rear holding devices. In doing so, the stability of the compacted seat unit on the rail may be improved, since the support strut introduces the load into the rail particularly in a direction vertical to the cabin floor. Preferably, the support strut is made from the same material as the seat frame and may constitute an integral part thereof. The support strut may be present in a certain orientation permanently and may engage a forward support device if it is positioned underneath or it may merely rest upon it.

It is advantageous if the second seat unit comprises two connecting struts, which each extend from a forward support device to a side facing away from the rear holding device of the same second seat unit along an associated rail and if they are designed to be connected with a rear holding device of a first seat unit arranged in front of it. Hereby, the distance between a forward seat unit and a forward support device of a compactable second seat unit is defined permanently, which clearly improves the quick reconfigurability of the cabin in particular. During the compacting of the second seat unit, the second seat frame is resultantly displaced in such a manner, that the forward support devices always remain at the same location of the rail defined by the first seat unit placed in front of it and that the rear holding devices are movable to the forward support devices up to a surface contact, wherein at the same time the forward holding devices and, consequently, the forward seat legs, are shifted underneath the first seat frame being arranged in front of the second seat unit. Preferably, the lengths of the struts, the support devices and the holding devices are adjusted to each other, such that a desired gain of installation space is enabled through compacting of the second seat unit without further due.

It is also preferred if the connecting struts are designed as rail covers or act as such. Since during the operation of the transportation system virtually no mechanical loads are absorbed by the connecting struts, they may also be realized in form of rail covers, which comprise a fixed length and protect a rail underneath from dirt or damages. Through this double function, additional weight may be eliminated and the presence of the second seat unit hardly differs from the one of a second seat unit, if it is not compacted.

The forward support devices of a second seat unit may be connected with rear holding devices of a first seat unit arranged in front of it in such a way, that they are movable in direction to the first unit, if the seat cushion of the second seat unit is folded up, only about such a way, that the folded up seat cushion (just) does not touch the backrest. Hereby, the comfort of a person on a first seat unit arranged in front it is not constricted. It may be taken care of that the backrest of this first seat unit may be usable without any limitations, such that the distance between the folded up seat cushion and the backrest with a completely swivelled down backrest is defined. Consequently, a certain distance between the seat cushion of the compacted second seat unit and of the first seat unit arranged in front of it should be met. Of course, this always depends on the angle, about which the backrest is swivable.

It is advantageous if the second seat frame is movable underneath the first seat frame about a distance in a range of 1 inch (about 2.5 cm) to 12 inch (about 30.5 cm) and preferably in a range of 2 inch (about 5.1 cm) to 6 inch (about 15.2 cm) with folded up seat cushion. With a construction depth of exemplarily 19 inch of a usual seat, an installation space of up to almost 20 inch may be released relative to a seating with a seat distance of 28 inch. For this it is conceivable to use a second seat frame, which comprises a single, exemplarily oval support tube. For a second seat frame with two support tubes, an installation space of about 15 inch or more may be released. In the latter case, exemplarily with five seat rows, an enlarged seat distance of three inch each may be realized.

Embodiments of the invention relate to a cabin of a transportation system, comprising at least one seat arrangement created by an above described seat system having a plurality of first seat units and at least one second seat unit.

The seat arrangement may comprise at least one group with a plurality of first seat units as well as an additional second seat unit. The first seat units are arranged one behind each other on the rails. The second seat unit is arranged behind the group of first seat units.

It may furthermore be advantageous to position the second seat unit arbitrarily between a plurality of first seat units, in particular for ensuring the accessibility of the service units at all times. Consequently, at least one first seat unit may be arranged behind the second seat unit.

Furthermore, also a plurality of groups of first seat units may be arranged in the cabin, wherein behind each group, such a compactable second seat unit may be arranged.

Finally, embodiments of the invention relate to an aircraft, comprising at least one such cabin.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Other characteristics, advantages and potential applications of the disclosed subject matter result from the following description of the exemplary embodiments illustrated in the figures. Furthermore, identical or similar objects are identified by the same reference symbols in the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
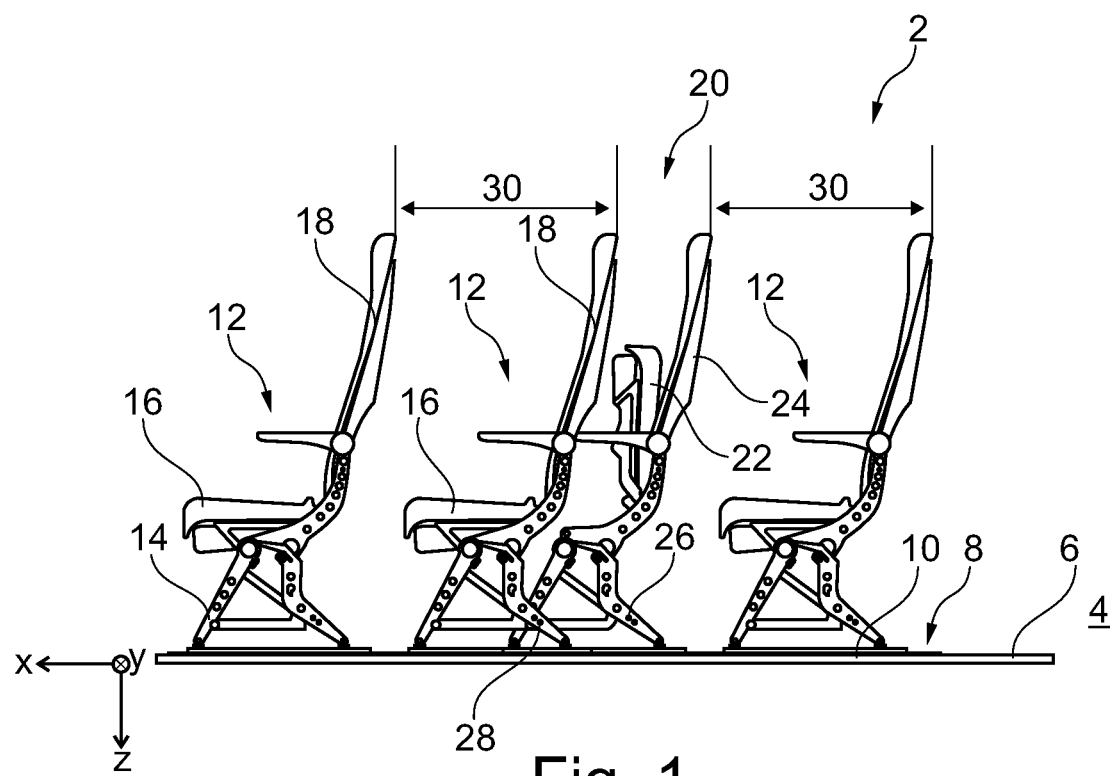
FIGS. 1 and 2 show a seat arrangement created by a seat system 2 in two different configurations.

FIG. 1 shows a seat system 2 in a cabin 4 of a transportation system having a floor 6, on which a rail system 8 having rails 10 is arranged. Three first seat units 12 are arranged on the rail system 8 and in each case constitute a passenger seat or a passenger seat row, respectively, on a first seat frame 14. The first seat unit 12 furthermore comprises a seat cushion 16, which exemplarily is not foldable, as well as a swivable back cushion 18.

In addition to the three first seat units 12, a second seat unit 20 is present, which is arranged between both rear first seat units 12 and comprises a seat cushion 22, which is foldable up and shown in a folded up state, a back cushion 24 and a second seat frame 26. In the illustration of FIG. 1, the first seat unit 20 is strongly compacted through the folded up seat cushion 22 and is able to assume the position shown in FIG. 1, at which the forward seat legs 28 extend underneath the seat cushion 16 of the first seat unit 12 positioned in front of it. Here, the folded up seat cushion 22 is placed directly behind the backrest 18. Resultantly, in cabin 4 an installation space of at least about 9 to 19 inch is released, which may be utilized by first seat units 12 for increasing the respective seat distances 30.

Figure 2:
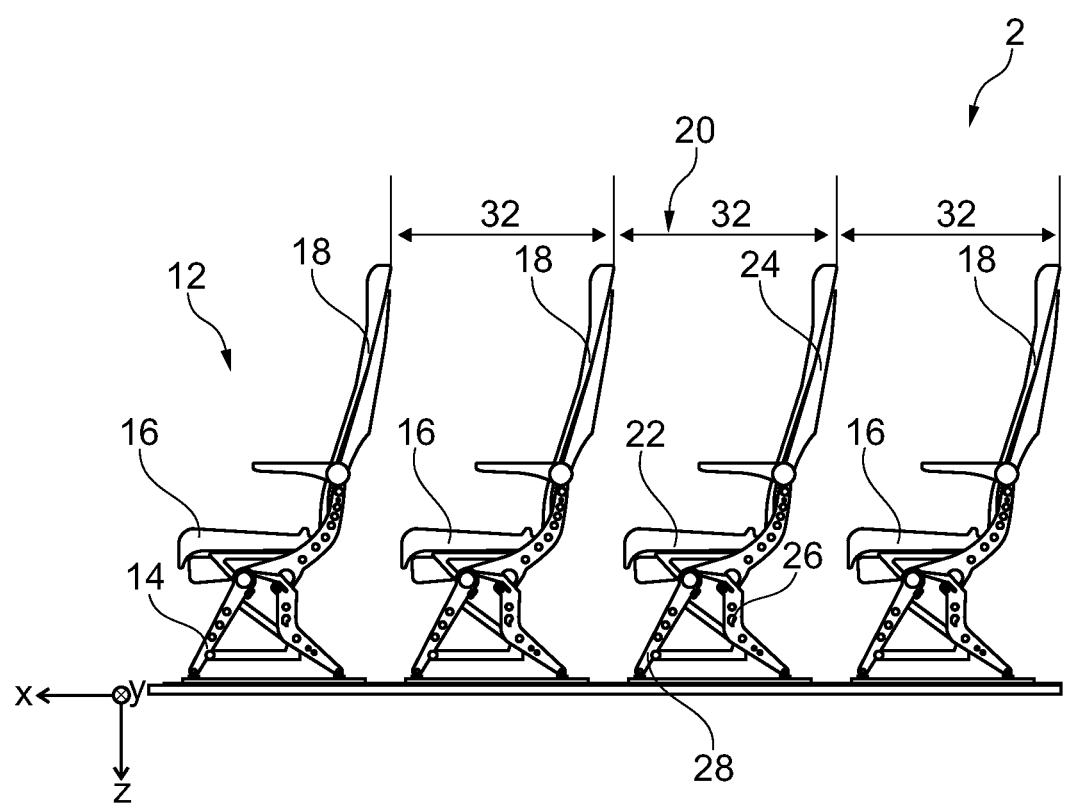

FIG. 2 shows the same seat system 2 at which the second seat unit 20 is not compacted, but shown with folded down seat surface 22. Here, the second seat unit 20 is virtually not to be differentiated from a second seat unit 12, also seat units 12 or 20, respectively, provide a normal seat; however, the achievable seat distances 32 are slightly smaller than the seat distance 30 in FIG. 1 altogether.

Consequently, for a quick reconfiguration of a cabin 4, a second seat unit 20 may be compacted, through folding the seat cushion 22 into a vertical position, after which the second seat unit 20 is moved close to a first seat unit 20 arranged in front of it and the resulting free installation space may be utilized by increasing the seat distances of all first seat units 12. It is to be understood, that the unit comprising the first seat unit 12 and second seat unit 20 may also be displaced altogether. As FIG. 1 clearly shows, the second seat frame 26 may even reach underneath the first seat cushion 16. The functional principle for ensuring this function is shown in the following figures.

Figure 3:
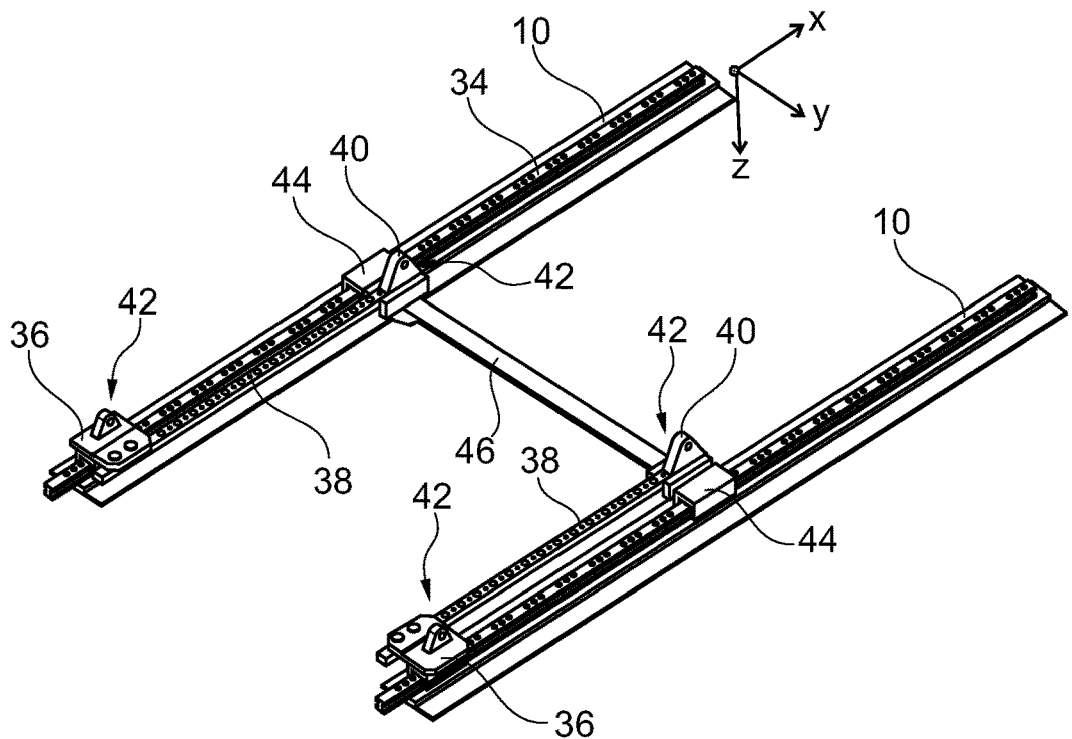
FIGS. 3 and 4 show a detail of a second seat unit in two different configurations.

FIG. 3 shows a detail of the seat system 2 in form of a sub-structure for a second seat unit 20. In a partial sectional view the two rails 10, which run parallel to each other, are shown, which rails 10 are exemplarily oriented parallel to a longitudinal direction x of the cabin 4. In the case shown, the rails 10 are realized in the form of so-called gliding rails, which comprise a profile cross-section having an undercut and are equipped with raster openings 34 at a top side. Two rear holding devices 36 are arranged on the rails 10, which comprise a recess fitting to the profile cross-section of the rail 10 and are glidingly supported thereon. Latching devices, components, or elements, which are not illustrated, may engage with the raster openings 34 of the rail 10 in order to fixate the position of the respective rear holding device 36 on the rail 10. Through the use of a gliding rail with a profile cross-section having an undercut, a lifting-off of the rear holding devices 36 may be prevented such that an engagement with raster openings 34 is sufficient to achieve a secure fixation of the object connected therewith.

In each case, an auxiliary rail segment 38 is arranged at the rear holding devices 36, which auxiliary rail segment extends parallel to the respective adjacent rail 10. Consequently, two auxiliary rail segments 38 are present between the rails 10. In each case these comprise a forward holding device 40, which is adapted for supporting a forward seat leg 28 of the second seat frame 26. For this, exemplarily a flange 42 is indicated, which may be arranged in the same way on the rear holding devices 36. The position of the flanges 42 at the forward holding devices 40 however leads to a lesser distance as at the rear holding devices 36.

For an additional support of the auxiliary rail segments 38, two forward support devices 44 are arranged at the rails 10, on which an auxiliary rail segment 38 is glidingly supported in each case. Preferably, the forward support devices 44 are adapted for always supporting the auxiliary rail segments 38 in a gliding manner without blocking, such that a force introduction in x-direction of the second seat unit 20 is accomplished exclusively over the rear holding devices 36 into the rail 10. The forward holding devices 40 exclusively serve for absorbing and introducing forces in directions perpendicular thereto, i.e. in y- and z-direction. It is to be understood that this constellation may also be possible vice versa in that the rear holding devices 36 merely introduce forces in y- and z-direction into the rail 10, while exclusively the front holding devices 40 introduce forces in x-direction into the rail 10. This may depend on the type of the seat realized by the seat system.

Both forward support devices 44 are further connected to each other by way of a transverse strut 46, which runs transverse to the rails 10 or the auxiliary rail segments 38, respectively. Thereby, in particular during displacement of the forward support devices 44, it may be ensured that both support devices 44 always comprise the same relative position to the rear holding devices 36 and that a skewing, canting or bending of the auxiliary rail segments 38 does not occur.

The position in FIG. 3 is equal to the position of the second seat unit 20 in FIG. 2, at which the seat surface 22 is folded down and the second seat unit 20 consequently acts as a usual passenger seat.

Figure 4:
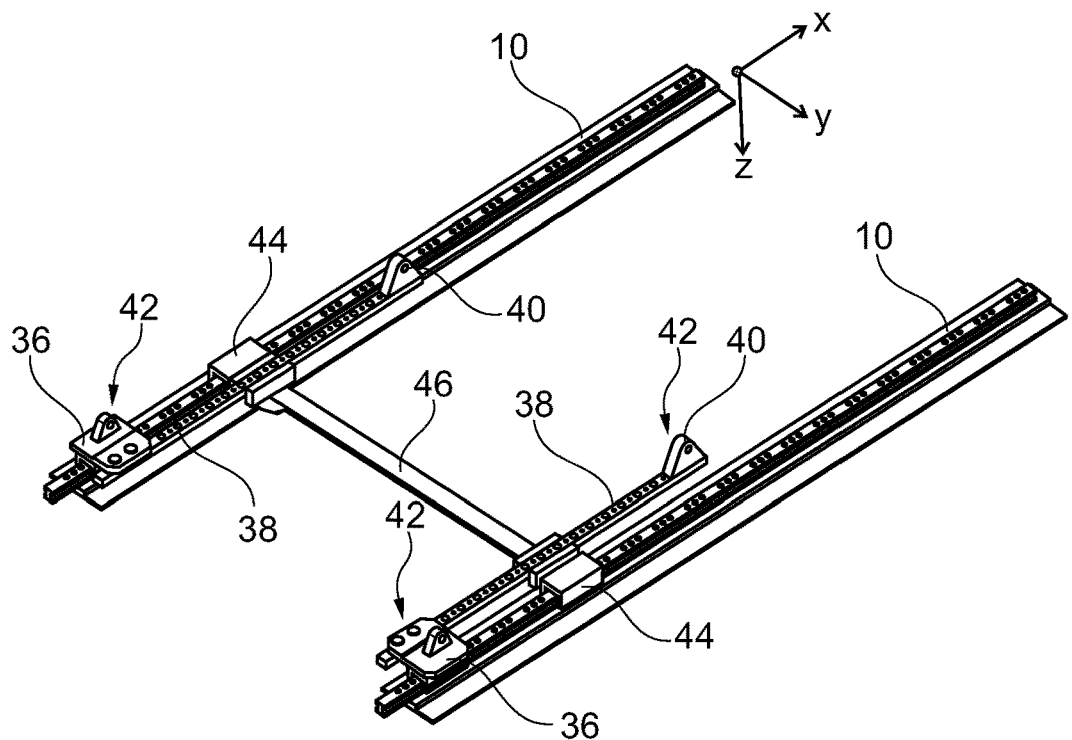

In FIG. 4, a slightly changed positioning of the elements to each other is illustrated. This is equivalent to a compacted position of the second seat unit 20, as shown in FIG. 1. The forward support devices 44 are moved to the rear holding devices 36, such that the forward holding devices 40 are spatially placed relatively freely. If forward seat legs 28 of the second seat unit 20 are arranged thereon, these may reach underneath the seat cushion 16 or a first seat frame 14 of a first seat unit 12, respectively. This is possible, since the clearance of the two forward holding devices 40 is smaller than the clearance between the rails 10, on which the rear seat legs of a first seat unit 12 arranged in front of it are placed. Hence, if a second seat unit 20 with a folded up seat cushion 22 is moved close to a first seat unit 12, the forward support devices 44 are urged to the rear holding devices 36 and the forward holding devices 40 may reach underneath the seat cushion 16 of a first seat unit 12. Different than the illustration in FIG. 4, also the forward support devices 40 may be moved flushly onto the rear holding devices 36.

Figure 5:
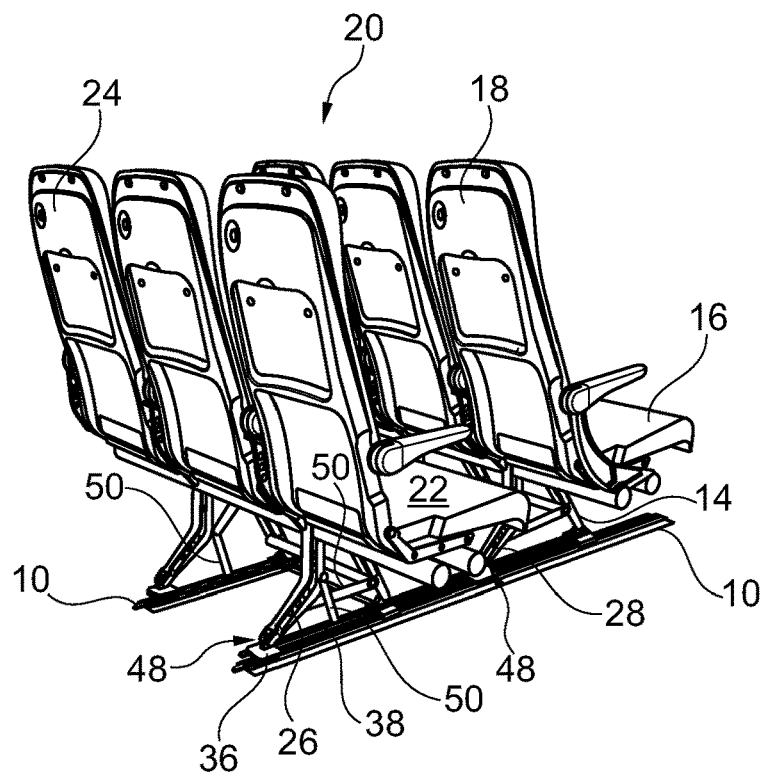
FIGS. 5 and 6 show the configurations of FIGS. 1 and 2 in three-dimensional views.
Figure 6:
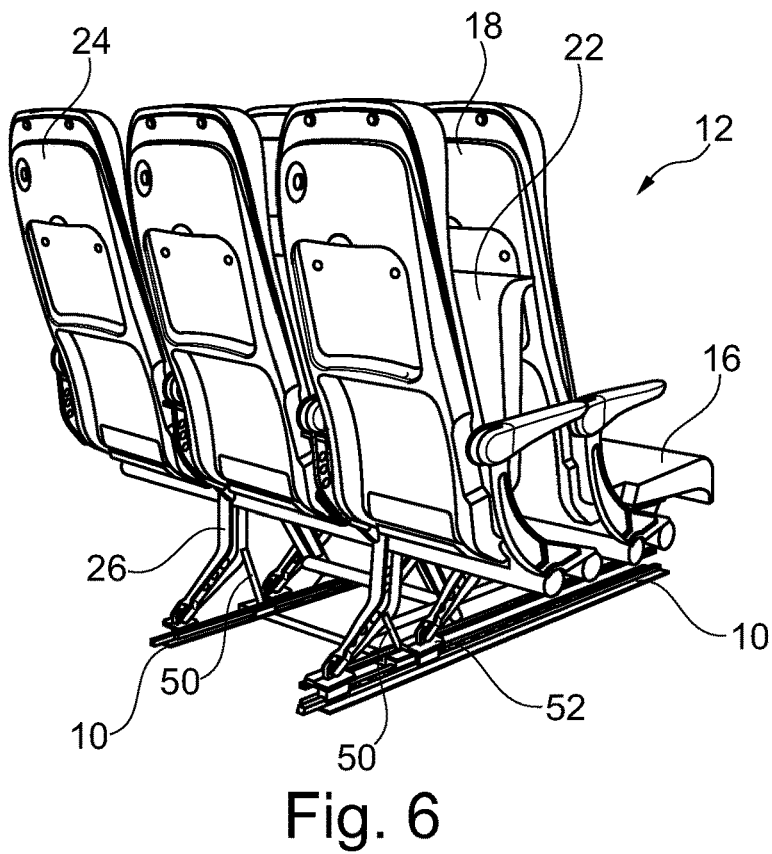

In a three-dimensional illustration, FIGS. 5 and 6 shown, which orientations the seat units 12 and 20 assume with the components being positioned according to FIGS. 3 and 4. The illustration in FIG. 5 correlates to the orientation of the components from FIG. 3. The second seat unit 20 is exemplarily shown as a seat row having three passenger seats, which are created abreast on the second seat frame 26. Rear seat legs 48 are arranged on the rear holding devices 36, while the forward seat legs 28 are arranged on the forward holding devices 40. Additionally, a support strut 50 extends from the rear seat leg 48 to an auxiliary rail segment 38 for an additional support of the rear seat leg 26 at the forward support device 40, if this is moved rearwards to the rear holding device 36. The support strut 50 may merely rest on the forward support device 44 or the auxiliary rail segment 38.

In FIG. 6, the second seat unit 20 is shown with folded up seat cushions 22, wherein the forward support devices 44 are moved in direction of the rear holding devices 36, create a surface contact with the support strut 50 there and, resultantly, the second seat unit 20 is very compact. Exemplarily, the forward support devices 40 are in surface contact with rear holding devices 52 of a first seat unit 12 arranged in front of it. Moving a first seat unit 12 to the compacted second seat unit 20 or pushing the second seat unit 20 onto the first seat unit 12 consequently leads to a reduced resting surface of the second seat frame 26 and to a clear increase of available installation space in the cabin.

Figure 7:
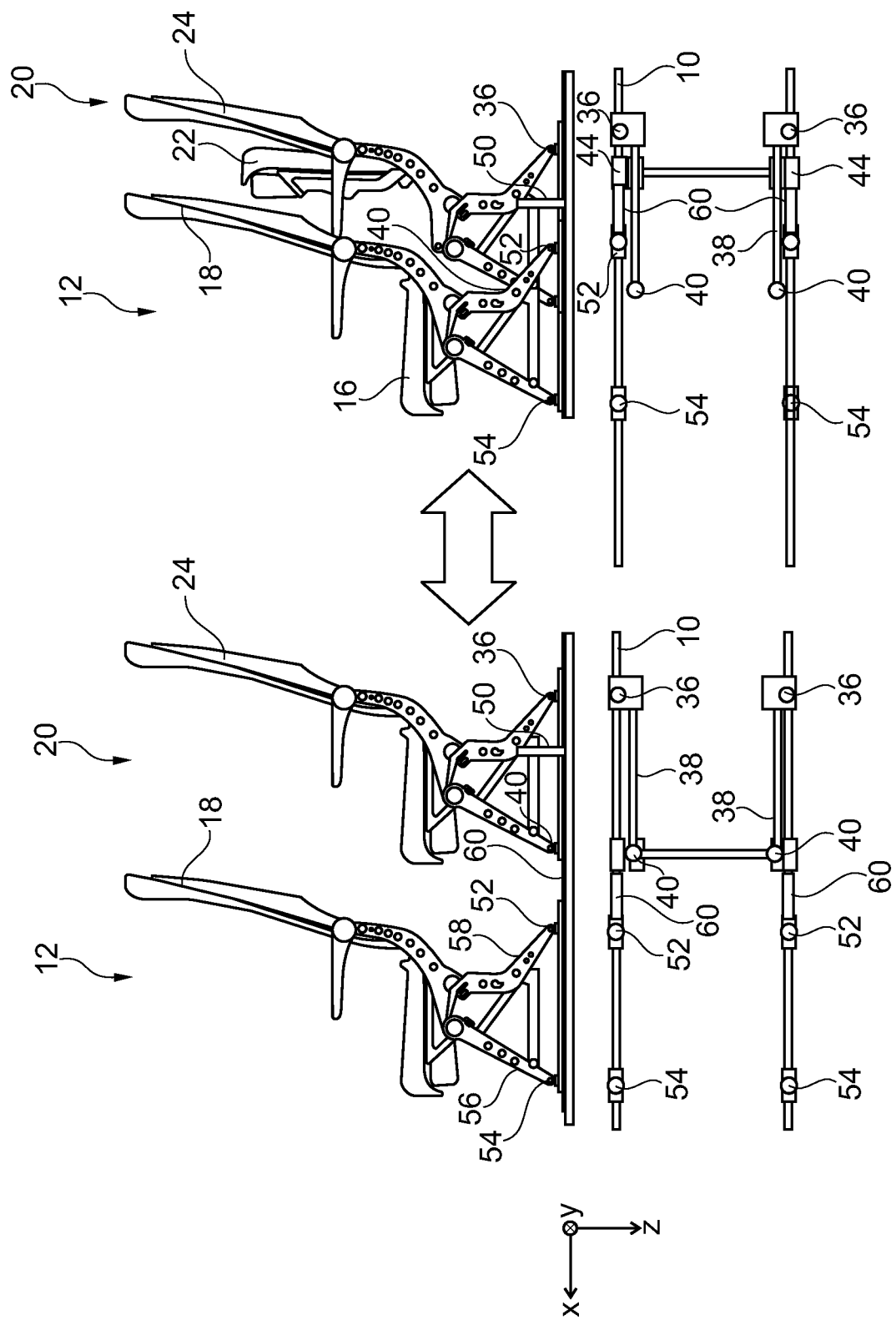
FIG. 7 shows the one first seat unit and a second seat unit in two different configurations and the associated components fastened at the rails schematically.

FIG. 7 shows the whole arrangement again schematically with a block-based view of the components mounted on the rails 10. A forward first seat unit 12 is hereby shifted to a compacted second seat unit 20 rearwards. In the left part of the view of FIG. 7, the first seat unit 12 and the second seat unit 20 create a usual arrangement of seats arranged one behind the other, while in the right part, a compacting is shown.

Underneath these arrangements, the mounting of the first seat unit 12 on the rails 10 is shown on the left side. Forward holding devices 54 for receiving forward seat legs 56 of a first seat unit 12 always comprise the same distance to the rear holding devices 52, which are connected to rear seat legs 58 of the first seat unit 12. Also, the distance between the rear holding devices 36 and the forward holding devices 40 of the second seat unit 20 are constant. If the first seat unit 12 is moved onto a compacted second seat unit 20, the rear holding devices 52 of the first seat unit 12 urge the forward support devices 44 in direction of the rear holding devices 36. The forward holding devices 40 then stand freely underneath the seat cushion 16 of the first seat unit 12.

In addition, for achieving a predetermined distance between the rear holding devices 52 and the forward support devices 44, e.g. for ensuring a sufficient movability of a backrest 18, a connecting strut 60 may be used, with which the rear holding devices 52 and the forward support devices 44 are connected. Since these connecting struts 60 virtually do not have to absorb a mechanical load, these may be realized in form of rail covers. They comprise a fixed length, allow a quicker changing configuration of the seating and at the same time fulfill the function of a rail cover.

With seat units 12 and 20 moved to each other, the support struts 50 may assume a surface contact with the forward support devices 44, such that a certain support in z-direction may be accomplished.

Figure 8:
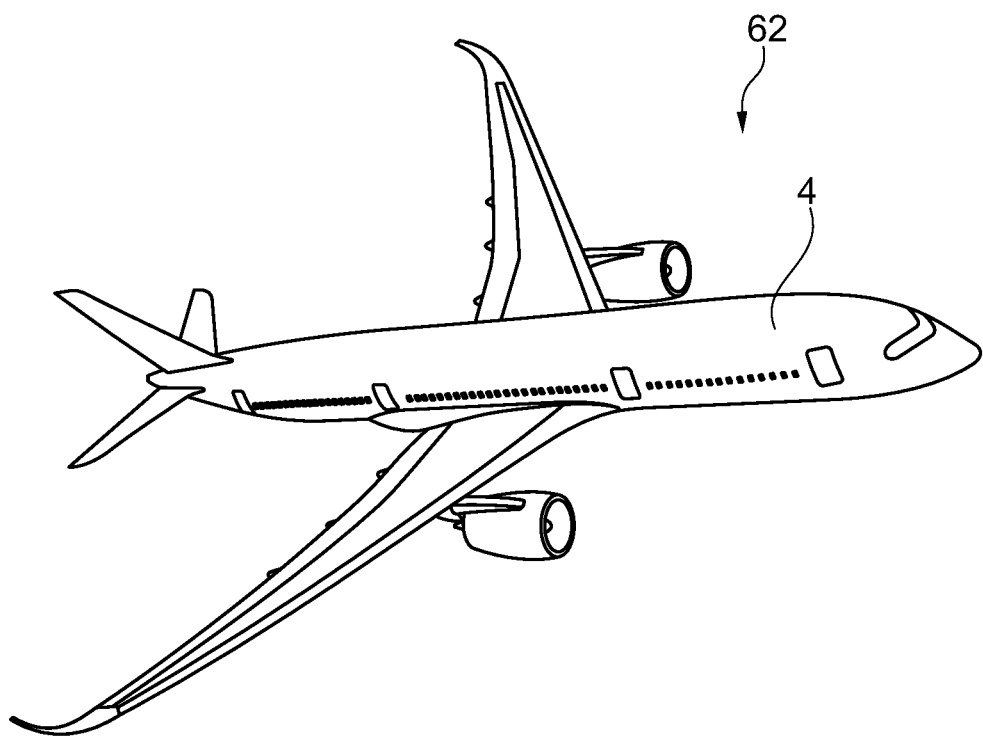
FIG. 8 shows an aircraft having a cabin and a seat arrangement positioned therein.

Finally, FIG. 8 shows an aircraft 62, which is equipped with a cabin 4, in which a seat arrangement created by the seat system 2 is present.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A seat system for a cabin of a transportation system, the seat system comprising:
   a first seat unit comprising a first seat frame having a seat cushion and a back cushion;
   a second seat unit located behind the first seat unit, wherein the second seat unit comprises a second seat frame having a foldable seat cushion and a back cushion; and
   a rail system attachable to a floor of the cabin, wherein the rail system includes:
      two main rails that run parallel to each other, wherein the two main rails are configured to receive the first seat unit and the second seat unit in selected positions; and
      two auxiliary rails that run parallel to each other, wherein the two auxiliary rails are located between the two main rails;
   wherein the second seat frame comprises two forward seat legs supported on the two auxiliary rails; and wherein the second seat unit has a stowed configuration in which the forward seat legs are located underneath the seat cushion of the first seat unit.

2. The seat system according to claim 1, wherein:
   the second seat unit comprises two rear holding devices, two forward holding devices and the two auxiliary rail segments;
   the rear holding devices are fastenable on the main rails and are each designed for supporting a respective rear seat leg of the second seat frame;
   wherein each auxiliary rail segment is supported on a respective rear holding device;
   wherein each auxiliary rail segment holds one of the forward holding devices at an end opposed to the rear holding devices; and
   wherein the forward holding devices are each adapted for supporting a respective forward seat leg of the second seat frame.

3. The seat system according to claim 2, wherein the second seat unit further comprises two forward supporting devices, which are each connected with a respective main rail and are each adapted for supporting a respective auxiliary rail segment.

4. The seat system according to claim 3, wherein the forward support devices are rigidly connected through a strut that extends transverse to the rails or the auxiliary rail segments, respectively.

5. The seat system according to claim 3, wherein the forward support devices are adapted for supporting the auxiliary rail segments to be displaceable in a permanently unblocked manner.

6. The seat system according to claim 3, wherein the second seat unit is configured to hold a support strut between a rear seat leg and a forward support device or an auxiliary rail segment of the same side each, when the forward support devices are shifted to the rear holding devices.

7. The seat system according to claim 3, wherein the second seat unit comprises two connecting struts, which each extend from a respective forward support device to a side facing away from the rear holding device of the second seat unit along an associated rail and are designed to be connected with a rear holding device of the first seat unit.

8. The seat system according to claim 7, wherein the connecting struts comprise rail covers.

9. The seat system according to claim 3, wherein the forward support devices of the second seat unit are connected with rear holding devices of the first seat unit in such a way, that the forward support devices are movable toward the first seat unit, if the seat cushion of the second seat unit is folded up, to a position in which the folded up seat cushion does not touch the backrest of the first seat unit.

10. The seat system according to claim 1, wherein, in the stowed configuration, from about 1 inch to 12 inches of a horizontal length, in a direction parallel to the main rails, of the second seat unit is located underneath the seat cushion of the first seat unit.

11. A cabin of a transportation system comprising a seat arrangement, the seat arrangement created by a seat system comprising:
 first seat units including a front first seat unit;
 a second seat unit located behind the front first seat unit; and
 a rail system attachable to a floor of the cabin having two main rails that run parallel to each other, for receiving the plurality of first seat units and the second seat unit in selected positions;
 wherein each first seat unit comprises a first seat frame having a seat cushion as well as a back cushion;
 wherein the second seat unit comprises a second seat frame having a foldable seat cushion and a back cushion; and
 wherein the second seat frame comprises two forward seat legs supported on two auxiliary rail segments that are arranged between the main rails wherein the second seat unit has a stowed configuration in which the forward seat legs are located underneath the seat cushion of the front first seat unit.

12. The cabin according to claim 11, wherein:
 the first seat units are arranged one behind each other on the rails; and
 the second seat unit is arranged behind at least one of the first seat units.

13. The cabin according to claim 12, wherein at least one first seat unit is arranged behind the second seat unit.

14. The cabin according to claim 12, further comprising a plurality of second seat units including the second seat unit located behind the front first seat unit, wherein a respective second seat unit is arranged behind each respective first seat unit.

15. An aircraft comprising a cabin, the cabin including a seat system comprising:
 first seat units;
 a second seat unit; and
 a rail system attachable to a floor of the cabin having two rails that run parallel to each other, for receiving the first seat units and the second seat unit in selected positions;
 wherein each first seat unit comprises a first seat frame having a seat cushion and a back cushion;
 wherein the second seat unit comprises a second seat frame having a foldable seat cushion and a back cushion; and
 wherein the second seat frame comprises two forward seat legs supported on two auxiliary rail segments that are arranged between the rails at least in a region, wherein the second seat unit has a stowed configuration in which the forward seat legs are located underneath the seat cushion of a respective first seat unit arranged in front of the second seat unit.

* * * * *